(12) United States Patent
Aisenberg et al.

(10) Patent No.: US 6,209,090 B1
(45) Date of Patent: *Mar. 27, 2001

(54) METHOD AND APPARATUS FOR PROVIDING SECURE TIME STAMPS FOR DOCUMENTS AND COMPUTER FILES

(76) Inventors: Sol Aisenberg, 36 Bradford Rd, Natick, MA (US) 01760; George Freedman, 5 Brook Trail Rd., Wayland, MA (US) 01778; A. Ze'ev Hed, 12 Wagon Trail, Nashua, NH (US) 03062; Richard Pavelle, 23 Berkshire Dr., Winchester, MA (US) 01890

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,292

(22) Filed: May 29, 1997

(51) Int. Cl.[7] .................................................. H04L 9/32
(52) U.S. Cl. ............................................. 713/28; 380/21
(58) Field of Search ..................... 380/23, 25, 51; 713/178, 175, 176

(56) References Cited

U.S. PATENT DOCUMENTS

| | | | |
|---|---|---|---|
| 4,649,266 | * 3/1987 | Eckert | 380/51 |
| 5,001,752 | 3/1991 | Fischer . | |
| 5,161,153 | 11/1992 | Westmore . | |
| 5,189,707 | 2/1993 | Blandford | 380/23 |
| 5,212,788 | 5/1993 | Lomet et al. . | |
| 5,241,675 | 8/1993 | Sheth et al. . | |
| 5,243,652 | 9/1993 | Teare et al. . | |
| 5,293,627 | 3/1994 | Kato et al. . | |
| 5,297,178 | 3/1994 | Martin | 377/26 |
| 5,334,974 | 8/1994 | Simms et al. . | |
| 5,367,306 | 11/1994 | Hollon et al. . | |
| 5,402,490 | 3/1995 | Mihm, Jr. | 380/21 |
| 5,410,739 | 4/1995 | Hart . | |
| 5,422,816 | 6/1995 | Sprague et al. . | |
| 5,440,313 | 8/1995 | Osterdock et al. . | |
| 5,467,342 | 11/1995 | Logston et al. . | |
| 5,499,294 | * 3/1996 | Friedman | 380/10 |
| 5,530,851 | 6/1996 | Fortier . | |
| 5,535,386 | 7/1996 | Wang . | |
| 5,544,353 | 8/1996 | Forman et al. . | |
| 5,712,916 | * 1/1998 | Windel et al. | 380/51 |
| 5,742,685 | * 4/1998 | Berson et al. | 380/25 |
| 5,751,809 | * 5/1998 | Davis et al. | 380/23 |
| 5,781,630 | * 7/1998 | Huber et al. | 380/23 |

FOREIGN PATENT DOCUMENTS

| | | | |
|---|---|---|---|
| 0635790 | 1/1995 | (EP) | G06F/12/14 |
| WO9203000 | 2/1992 | (WO) | H04L/9/00 |
| WO9515522 | 6/1995 | (WO) | H04L/9/32 |
| WO9629702 | 3/1996 | (WO) . | |

OTHER PUBLICATIONS

Bruce Schneier, "Applied Cryptography: Protocols, Algorithms, and Source Code in C", 2nd edition John Wiley and Sons, N.Y. (1995) pp. 75–79 (Timestamping Services).*

* cited by examiner

Primary Examiner—Gail Hayes
Assistant Examiner—James Seal
(74) Attorney, Agent, or Firm—Kudirka & Jobse, LLP (57) ABSTRACT

Secure time stamps generated by the inventive apparatus and method include an externally generated time signal, such as a GPS signal, a time stamp serial number, generated through an irreversible process which may not be duplicated by the apparatus, and one or more check sum values used to verify the content of the time stamp parameters or any data file associated with the time stamp. Also disclosed are apparatus and methods for verifying the authenticity of previously generated time stamps in either electronic or tangible form. The time stamp generator apparatus may be implemented as an add-on board to an existing computer system or as a stand alone device which may also include a GPS receiver and a scanner for verifying previously generated time stamps.

25 Claims, 6 Drawing Sheets

METHOD AND APPARATUS FOR PROVIDING SECURE TIME STAMPS FOR DOCUMENTS AND COMPUTER FILES

FIELD OF THE INVENTION

The present invention relates to apparatus and methods for providing secure time stamps to documents and transactions.

BACKGROUND OF THE INVENTION

A need has always existed for a method of establishing the age and authenticity of documents, particularly for legal and business purposes. For documents written on paper, methods currently exist for establishing the age of a document by analysis of the chemical composition of the paper and the ink. Further, handwriting analysis can be used to establish the authenticity of the document signatures. These methods, however, are not practical for widespread use and require a significant level of expertise to establish either the age or the authenticity of the document signatures.

Impartial third party notaries have been typically relied upon to establish both the age and authenticity of paper documents. With such an approach, there is no assurance against collusion or conspiracies to defraud involving a third party notary. Still, further, where a large volume of transactions or documents related thereto, such as with financial transactions, is involved, the task of third party notarization becomes too cumbersome and the ability to immediately notarize the document is not possible.

With the rapid qrowth of electronic documents and the movement toward a paperless society, there is an increasing need for establishing not only the integrity of an electronic document but the exact date and time, and, possibly, even the place at which a document was created or last modified.

Prior time stamp apparatus have used internal clock modules contained within a data processing system or the time stamp apparatus itself to generate the value of the day and time within a time stamp. For security purposes, this solution is unacceptable since such internal clocks are readily modifiable by the user to reset the date and time upon computer initialization or power loss. One such apparatus is disclosed in U.S. Pat. No. 5,136,643, issued to Fisher, entitled PUBLIC/KEY DATE TIME NOTARY FACILITY. The system disclosed in Fisher contains one or more digital clocks, the values of which are averaged and used as part of a notary time stamp value. Although the clock module in the Fisher apparatus has been designed to prevent physical tampering, the problem of continuous power to the clock is not solved, since even backup batteries lose power eventually. Further, since the internally generated clock signal is not a universally recognized, the authenticity of the time stamp is not universally recognized. United States Patent 5,189,700, issued to Blandford, entitled DEVICES TO SUPPLY AUTHENTICATED TIME AND TIME STAMP AND AUTHENTICATE DIGITAL DOCUMENTS, likewise discloses a device in which a resident real time clock provides the source of time for the time stamps. The apparatus disclosed in Blandford suffers from the same inherent problems as the Fisher patent, namely, the internally generated clock is not a universally recognized value for the time at any given instance. Hence, the credibility of the time stamps issued therefrom is similarly not universally recognized.

Accordingly, in light of the above deficiencies in previously attempted solutions, a need exists for a method and apparatus by which a highly accurate and universally accepted notary stamp may be applied to both paper and electronic documents and associated transactions, such a stamp being useful to both compute the age of a document, and, in the case of electronic documents, verify the authenticity and integrity of the document. A further need exists for a method of providing a "virtual seal" on computer files and records so that the exact date, time and place of the sealing may be later ascertained. Further, a need exists to determine whether modifications or subsequent edits to such sealed documents has occurred and, possibly, even a history of such modifications to the documents.

SUMMARY OF THE INVENTION

The above described deficiencies in prior devices and previously described needs are fulfilled by the present invention which contemplates a method and apparatus for generating a time stamp from a widely accepted, externally generated time signal. The time stamp further comprises a time stamp serial number generated through an irreversible process which may not be duplicated by the same generating apparatus. In addition, time stamp includes one or more check-sum values based on the contents of the time stamp and/or the document with which the time stamp is associated.

In one aspect of the invention, an apparatus for generating notary time stamps comprises means for obtaining a time signal generated external to the apparatus, the time signal comprising date and time information. The apparatus further comprises logic means for creating a unique, sequential time stamp identifier through an irreversible process. The apparatus further comprises means for forming the time stamp and for generating a check-sum value which may be based on the content of one or all of the parameters of the time stamp itself. In an illustrative embodiment, the external, signal comprises a time signal in Universal Time Code (UTC) format or a signal based on a Global Positioning Satellite (GPS) signal. The logic means for creating the sequential time stamp identifier comprises a programmable memory device having a plurality of cells, each of which may be written or "burned" only once, to irreversibly change the digital signature output from the memory device.

According to a second aspect of the invention, a method for generating time stamps to be associated with documents and data files comprises the steps of receiving a request for a time stamp, retrieving an external time signal including date and time information, irreversibly modifying the output signature of a write-once memory to generate a unique, sequential time stamp identifier, generating the notary time stamp from the date and time data and the time stamp identifier, and generating a check-sum value derived at least partially from the date and time data or time stamp identifier.

According to a third aspect of the invention, a notary time stamp for association with documents and data files comprises a source identifier uniquely identifying the source of the time stamp, a time stamp sequence identifier generated through an irreversible process by the source of the notary time stamp, time and date data obtained externally of the source of the notary time stamp, and a check-sum value derived from at least one of the source identifier, time stamp sequence identifier and day and time data.

According to yet a fourth aspect of the invention, an apparatus for verifying the authenticity of a time stamp is presented, the time stamp parameters including a source identifier, a time stamp sequence identifier, date and time data and a check-sum value. The apparatus for verifying the authenticity comprises means for reading the notary time stamp parameters and means responsive to the check-sum value for verifying the integrity of the parameters from which the check-sum value is derived.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 4A:
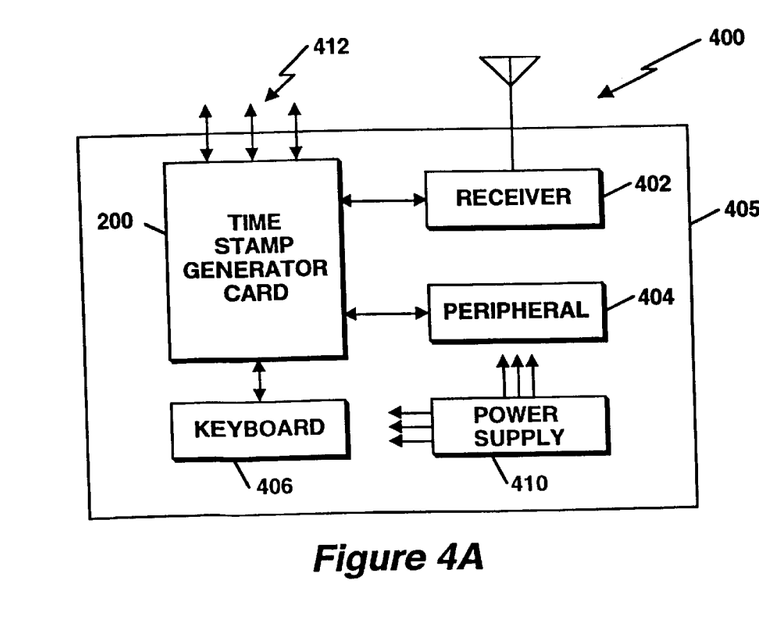
FIG. 4A is a schematic block diagram of an alternative embodiment of the notary time stamp apparatus of FIG. 2.

In accordance with a first illustrative embodiment of the invention, an apparatus for generating notary time stamps comprises a collection of logic components mounted to a circuit board. The circuit board which is insertable into an existing data processing systems particularly a personal computer, is described in detail with reference to FIG. 2, or may be configured as a standalone apparatus, as described with reference to FIG. 4. Prior to describing the embodiment of FIG. 2 in detail, a brief overview of a computer system suitable for use with the invention is provided below.

Figure 1:
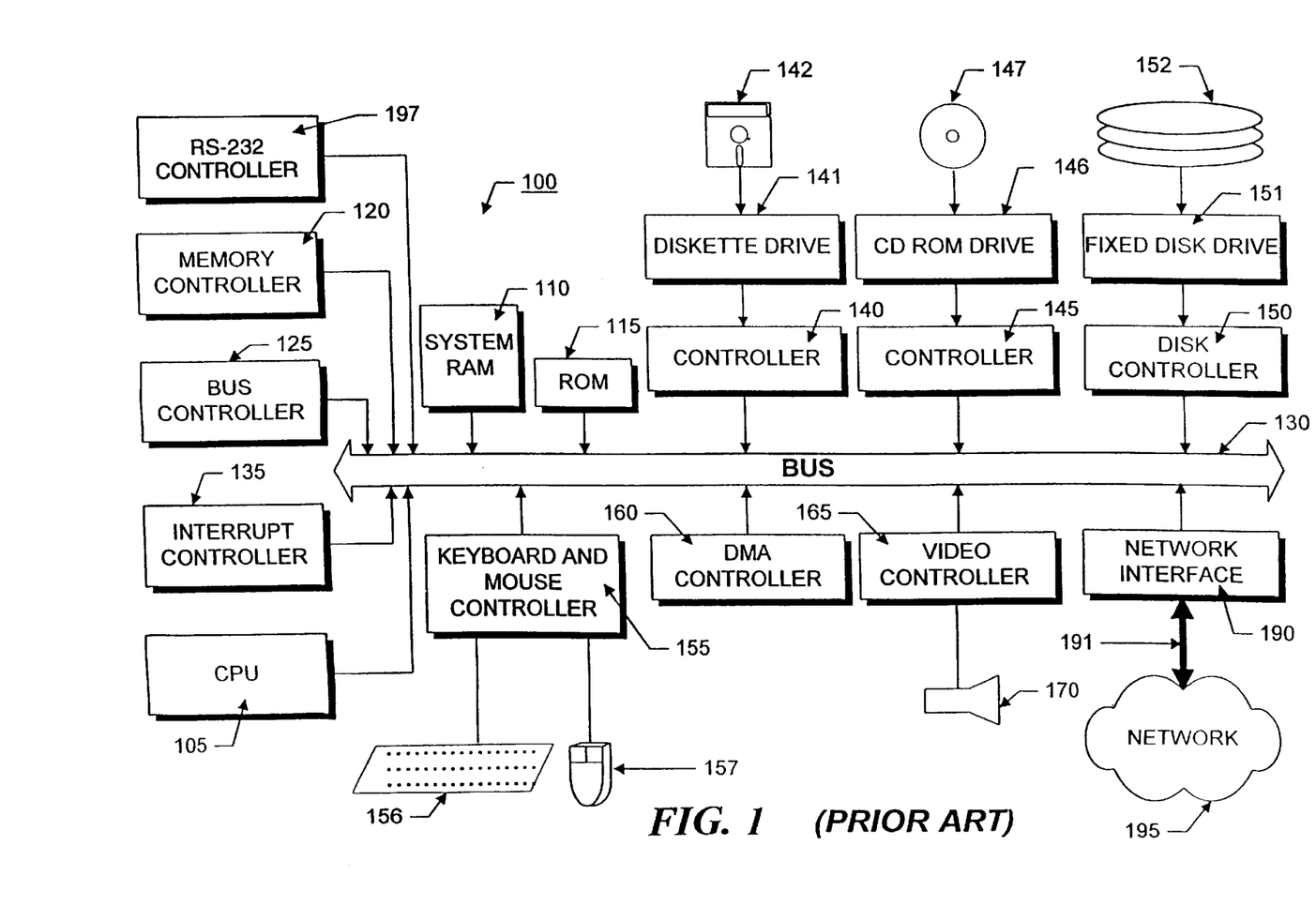
FIG. 1 is a schematic block diagram of a computer system suitable for use with the presentation.

FIG. 1 illustrates the system architecture for a computer system 100, such as an IBM PS/2® computer with which the invention can be implemented. The exemplary computer system of FIG. 1 is for descriptive purposes only. Though the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147 or hard disk 152. Data and software may be exchanged with computer system 100 via removable media such as diskette 142 and CD-ROM 147. Diskette 142 is insertable into diskette drive 141, which is, in turn, connected to bus 130 by controller 140. Similarly, CD-ROM 147 is insertable into CD-ROM drive 146, which is in turn, connected to bus 130 by controller 145. Finally, hard disk 152 is part of a fixed disk drive 151, which is connected to bus 130 by controller 150.

User input to computer system 100 may be provided by a number of devices. For example, keyboard 156 and mouse 157 are connected to bus 130 by keyboard and mouse controller 155. Other peripheral devices may be connected to bus 130 by controller 197, which may be an RS-232 serial port controller, as illustrated, or alternatively, a parallel port controller. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by a video controller 165, which controls video display 170. Computer system 100 also includes a communications adapter 190 which allows the system to be interconnected to a local area network (LAN) or a wide area network (WAN), or the Internet schematically illustrated by bus 191 and network 195. Alternatively, communication adapter 190 may be a PCMCIA bus adapter which allows any number of peripherals adhering to the PCMCIA standard to be interfaced with computer system 100 in a manner within the scope of those skilled in the art.

Figure 2:
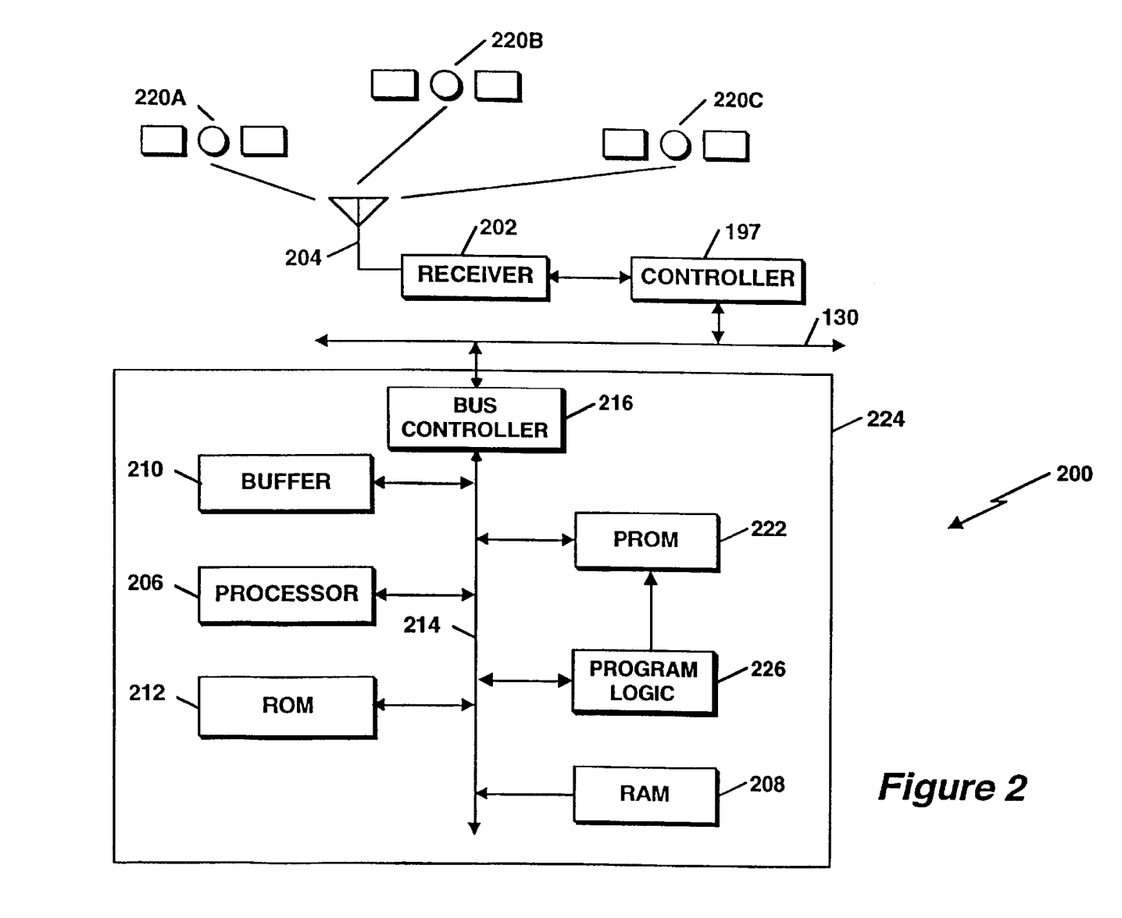
FIG. 2 is a schematic block diagram of the notary time stamp apparatus of the presentation.

Computer system 100 is generally controlled and coordinated by operating system software, such as the OS/2® operating system, available from the International Business Machines Corporation, Boca Raton, Florida or Windows NT, available from Microsoft Corp., Redmond, Wash. The operating system controls allocation of system resources and performs tasks such as process scheduling, memory management, and networking and I/O services, among other things. Referring to FIG. 2, a notary time stamp generator 200 in accordance with a first embodiment of the present invention is illustrated. Generator 200 comprises processor 206, RAM memory 208, buffer memory 210, ROM memory 212, internal bus 214, bus controller 216, circuit board 224, and programmable read-only memory (PROM) 222. In addition, a plurality of satellites 220A-C, receiver 202, antenna 204, and external bus 130 are illustrated, although not part of generator 200.

In the contemplated embodiment, the functional elements of generator 200 may be implemented with discrete components and integrated circuit components including but not limited to small scale logic, large scale logic, or very large scale logic components. The components are mounted to circuit board 224 and are interconnected to one another via internal bus 214 and possibly other connections. In the illustrative embodiment, internal bus 214 may be a multi-bit bus, e.g. an 8-bit, 16-bit, 32-bit, or 64-bit bus, and is coupled to external bus 130 via bus controller 216. Bus controller 216 provides signal buffering and controls the flow of data and controls signals between internal bus 214 and external bus 130, in a manner reasonably understood by those skilled in the art. For example, controller 216 may be implemented as a serial port controller, such as an RS-232 or compatible controller, or alternatively, may be a parallel port controller or a PCMCIA controller/adapter. External bus 130 may be implemented as a 16-bit or 32-bit bus used to interface with computer system 100 of FIG. 1 or other computer systems and peripheral devices. Alternatively, a portion of external bus 130 may be integrally formed on circuit board 224 so as to establish an electrical connection with controller 216 upon insertion into the back plane connectors of a conventional personal computer. In such an embodiment, generator 200 receives power through the back plane connection and, accordingly, does not need a separate power supply.

Processor 206, in the illustrative embodiment, may be implemented with any number of commercially available microprocessors, such as the X86 family of microprocessors available from Intel Corporation, Santa Clara, Calif. or the Motorola 68000 family of processors available from Motorola, Inc. Schaumburg, Ill. Those skilled in the art will appreciate that instead of a microprocessor, the processing functions described hereafter may be similarly implemented with a combination of firmware and dedicated integrated circuits capable of performing similar functions. As will be described hereinafter in greater detail, the processor 206 performs the necessary process steps for generation of the notary time stamp of the present invention. Processor 206 is controlled by instructions or sequences of instructions which may be stored in ROM 212, RAM 208, local memory contained internally within the processor 206 or even system RAM 110 of FIG. 1.

Figure 3:
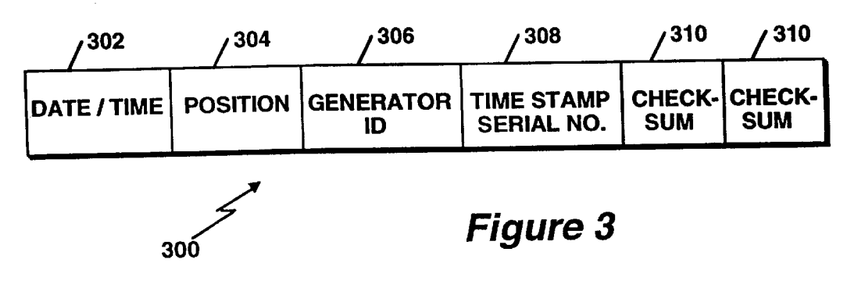
FIGS. 3 are schematic representations of the notary time stamp data structure in accordance with the present invention.

ROM 212 may be implemented with any number of commercially available read only memory circuit elements and functions to store data and/or sequences of instructions useful by processor 206. Similarly, RAM 208 may be implemented with any number of commercially available random access memory circuit elements and serves to temporarily store data or other information usable by processor 206. Buffer memory 210, in the illustrative embodiment, may be implemented as a separate portion of random access memory or, alternatively, may comprise a delineated portion of RAM 208. Buffer memory 210 may be used to store the value of the notary time stamp and the component values thereof during the generation process, as described in greater detail with reference to FIGS. 34.

PROM memory 222 is utilized, in the illustrative embodiment, as a means for irreversibly generating a sequence of unique digital signatures used to identify the notary time stamps of the present invention. PROM 222 may be implemented with any number of commercially available "write-once" memory devices, the cells of which are unmodifiable once "burned". In the illustrative embodiment, a high-energy write signal is selectively supplied to PROM 222 causing an irreversible "burning" of one or more selected cells within the PROM, thereby changing the overall digital output or signature of the PROM device after each burning. PROM 222 cannot be used to generate the same digital signature twice. In this manner, the use of unique time stamp serial number and a unique generator identifier provide a tamper-proof technique of generating time stamps. The extra electrical power needed for the write signal supplied to PROM 222 may be supplied by any number of sources, including an external power supply, internal batteries, or through a serial or parallel port associated with computer system 100. Program logic 226 associated with PROM 222 and contained on generator 200 ensures that the appropriate cell within PROM 222 is burned, thereby allowing the output digital signature of the PROM to be incrementally and permanently altered. Such logic is within the scope of those skilled in the art and may comprise a simple incrementation or decrementation function, depending on the size, structure and addressing scheme associated with the PROM.

In the illustrative embodiment, generator 200 is designed to obtain a timing signal from a source external to generator 200 itself. Such time signals may be obtained from a receiving device, such as receiver 202, coupled directly to generator 200 through a dedicated bus, or, alternatively, operatively coupled to generator 200 through external bus 130 as well as possibly through communication networks 191 and 195, as explained hereinafter.

Receiver 202, in the illustrative embodiment, may comprise any number of commercially available receivers capable of obtaining a nationally or internationally accepted timing signal, such as the NAVSTAR Global Positioning System (GPS), a LORAN-C signal, a World-Wide Verification Signal, or other signal that is compatible with international timing systems, such as the universal coordinated time (UTC) system.

In the illustrative embodiment, receiver 202 may be implemented with any number of commercially available GPS receivers. To better facilitate an understanding of the invention, some background about the nature of the GPS signal is provided. The NAVSTAR Global Positioning System (GPS) is a precise satellite navigation system installed by the U.S. Department of Defense, comprising 24 satellites orbiting the earth in 12-hour orbits. The GPS system provides position information in three dimensions (latitude, longitude, and altitude) and provides full 24-hour service for time broadcasts. In operation, each satellite continually broadcasts its own position and its own precise time. The GPS system offers time stability to within 300 ns. By using the signals from multiple of the GPS satellites, a receiver, such as receiver 202, may determine the exact time, latitude, longitude and altitude of the receiver.

One such receiver suitable for use with the present invention is the Trimble Mobile GPS Locator 110, commercially available from Trimble Navigation Ltd., Sunnyvale, Calif. The Trimble Mobile GPS Locator 110 comprises a GPS antenna and receiver which generates precise GPS position and time data and is connectable to either generator 200 or a personal computer via a serial interface, such as an RS-232 interface, or compatible controller. The output of such devices may be in a number of formats including UTC time sequence (ASCII) format. In addition, a Mobile GPS Source Developer's Kit (SDK) is commercially available from Trimble Navigation, Ltd. to allow for the design of custom GPS applications for various Trimble products. Such source developer's kit may be utilized to customize the data stream output by a Trimble receiver in accordance with the present invention.

Another receiver suitable for use with the present invention is the Mobile GPS PCMCIA card also commercially available from Trimble Navigation Ltd. The Mobile GPS PCMCIA card may interface with a PCMCIA bus adaptor of either generator 200 or computer system 100 in a conventional manner and generates similar, periodic digital sentences similar to the previously described receiver. As a variation to the illustrative embodiment of notary time stamp generator 200, the functions of processor 206, RAM 208, buffer 210, ROM 212, and bus 214 may be performed by similar components already within computer system 100, e.g. CPU 105, RAM 110, ROM 115 and bus 130. The methods performed by such components, as well as the programming instructions necessary to achieve such methods, are described hereinafter with reference to FIGS. 5–6. In such an embodiment, receiver 202 is connectible to bus 130 via a serial or parallel port controller, as previously described. In addition, a separate board containing PROM 222 and program logic 226 may be likewise connectible to bus 130 via a serial or parallel controller, in a manner similar to receiver 202. With this embodiment, many existing computer systems may be upgraded to perform the functions of the inventive stamp generator through installation of the appropriate programming instructions and connection of a receiver 202 and PROM 222 and its associated programming logic 226.

Referring to FIG. 3, a data structure suitable for use as a notary time stamp in accordance with the present invention is illustrated as a time stamp 300. Time stamp 300 comprises a date/time field 302, an optional position field 304, a generator identification field 306, a time stamp serial number field 308, and one or more check sum fields 310. Time/date field 302 contains date and time information as received from a source external to generator 200. The length and content of the data contained in field 302 may vary depending on the source of the date and time information. For example, if the source of the time and date information is any of the previously mentioned Trimble Navigation products, the field will have a (UTC) format. Generator 200 can be desioned to retrieve external timing signals from more than one source. For example, a timing signal may be achieved over a network from a source on the Internet or through a dedicated receiver directly connected to the generator 200 or a computer system 100 to generator 200 is coupled. In the illustrative embodiment, field 302 may include an identifier code within the time date field which identifies the source and/or format of the time and date information.

Optional position field 304 of time stamp 300 may comprise a digital word also generated by receiver 202 representing the latitude and longitude of the receiver at the time a notary time stamp 300 was requested. A number of techniques may be used to generate the binary value of the serial number field 308. Depending on the implementation of receiver 202, the positional information necessary to include position field 304 may or may not be present. For example, some of the previously mentioned receivers commercially available from Trimble navigation provide positional information in their output data stream, or, alternatively, such information is available for extraction from the data stream and reformatting at the designer's discretion using the SDK available from that manufacturer. The value of position field 304 is particularly relevant with the implementation of the invention as described with reference to FIG. 4 in which the receiver 402 may be housed in the same apparatus with the notary stamp generator 400, as described hereinafter.

Identification field 306 comprises a unique identifier associated with generator 200 and may be implemented with either a 16 or 32 bit digital word. In the illustrative embodiment, the value representing the identification field 306 may be hardwired using discrete components, such as resistors potted in epoxy, at the time which generator 200 is manufactured. Alternatively, the identifier may be programmed into an unalterable portion of ROM memory associated with the time stamp generator 200. The identification field is unique to each specific generator manufactured.

Time stamp 300 further comprises a serial number field 308, which, in the illustrative embodiment, may be implemented with a unique 16, 32 or 64 bit binary value. In the illustrative embodiment, the serial number field 308 is a unique identifier generated by generator 200 through an irreversible process. Specifically, PROM 222 is supplied with a high energy write signal causing an irreversible burning of a predetermined cell or cells within the PROM. Subsequently, reading a pattern of cells from PROM 222 outputs a unique binary signature which may be used as the value for serial number field 308. By selectively burning cells within the PROM in a predetermined sequential fashion, e.g. incrementing or decrementing the address of the last cell burned, the digital signatures output from PROM 222 form a sequence of digital signatures which may not be reset or recreated using the same PROM. The number of sequential serial number values obtainable from a PROM depends on the size of the PROM and any initial or default values present or burned into the PROM upon insertion into generator 200. Once the PROM has been completely utilized, it may be replaced with a new PROM having a different initial value. In this manner, a particular generator 200 having a unique identifier associated therewith will never generate the same time stamp serial number twice.

In addition, time stamp 300 further comprises one or more check-sums 310 which may be implemented with any number of known check-sum algorithms. For example, check-sum 310 may include a title count of characters within any one of fields 302–308 or any combination thereof. Alternatively, the check-sum algorithm used to derive the value of field 310 may include a total character count plus a check-sum for sequence involving prime numbers such as 1, 2, 3, 5, 7, 11 and 13.

The notary time stamp of the present invention is contemplated for use with both tangible hard copy documents as well as electronic documents or data files. In the latter instance, time stamp 300 is written into a portion of memory associated with the data file or document. This portion of memory associated with the document is preferably unaccessible and unmodifiable except by time generator 200. For data files forming a portion of a database, the database may include a specific field specifically designed for storing of the time stamp 300. For time stamps associated with a data file, check sum 310 may be computed from the content of the data file, in place of, or in combination with, the content of any one of the fields of time stamp 300. For example, the time stamp may contain two check-sum values, one derived from the contents of the data file and the other derived from the contents of the time stamp itself. Alternatively, the time stamp may include a separate check-sum derived from both the contents of the data file and one or more of the time stamp fields. In this manner, any attempt to change the content of the document as well as the time stamp will be flagged when the check-sum is verified through an authentication process, as explained hereinafter.

In instances where a history of changes to a document is desired, the memory associated with the data file for storing the time stamp may be of sufficient size to store multiple time stamps entries, thereby providing a chronology of the exact dates and times at which the document was modified.

Referring now to FIG. 4A, a schematic block diagram of a stand-alone time stamp generator 400 is illustrated. Generator 400 is similar in design and architecture to generator 200 as previously described with reference to FIG. 2. In addition, generator 400 includes a power supply 410, housing 405 and several ports 412, for example, serial or parallel ports or a PCMCIA adapter, a receiver 402, similar to receiver 202 previously described, and a peripheral 404 and keyboard 406, all internally coupled to internal bus 214. Alternatively, but not shown, receiver 402 and peripheral 404 may be coupled directly to generator 200 through the various ports and adaptors.

Figure 4B:
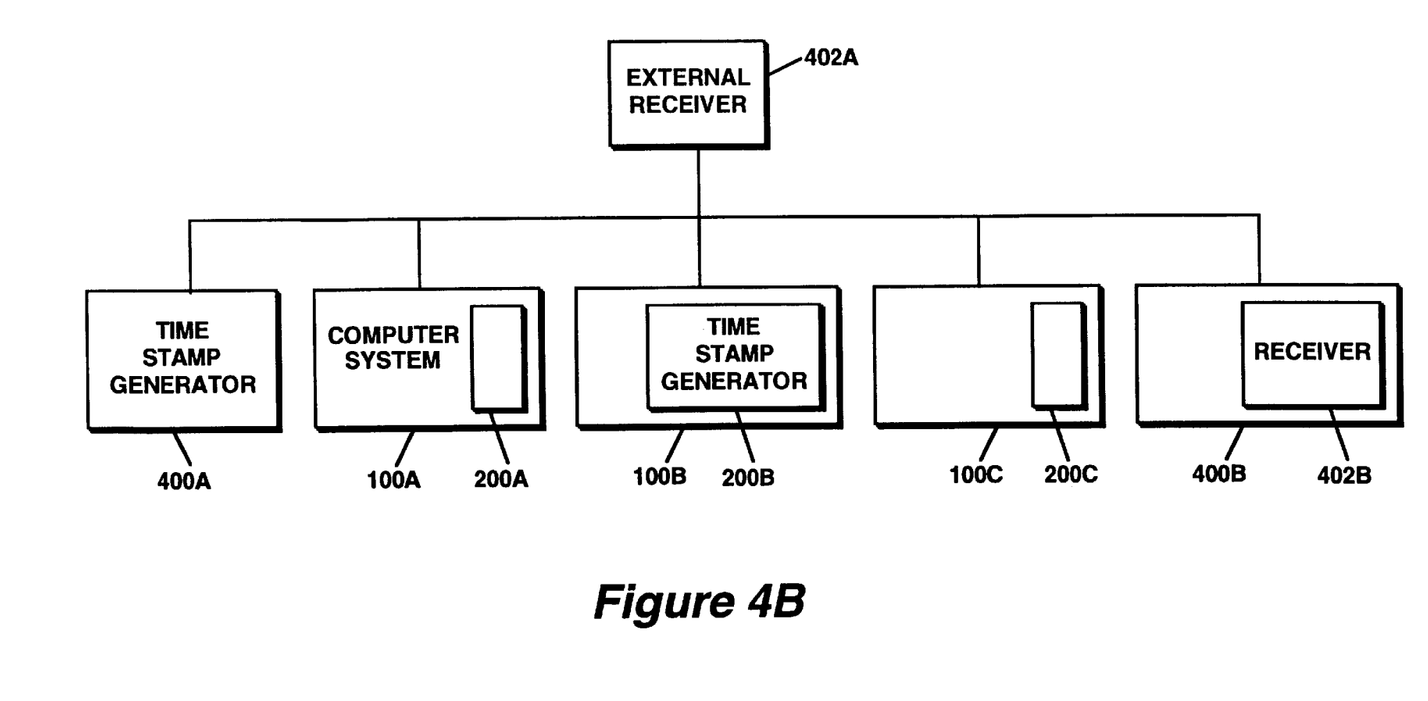
FIG. 4B is a schematic block diagram illustrating one or more inventive notary time stamp generator networked to a time signal source.

Peripheral 404 provides a means through which a time stamp value may be fixed to a tangible document. For instance, peripheral 404 may comprise any number of commercially available bar code generators which can translate the time stamp 300 into a bar code representation and affix the bar code to a tangible document, for example by insertion of the document into a slot within housing 405 or peripheral 404. In addition, peripheral 404 may include a scanning device for reading time stamp values. In an implementation where the time stamp is affixed to a tangible document as a bar code, peripheral 404 may include a scanning apparatus implemented with any number of commercially available bar code readers. One such scanning apparatus which may be implemented with a reduced number of moving parts and reduced power consumption is disclosed in U.S. Pat. No. 5,350,909, issued to Powell, et al. and entitled OPTICAL SCANNER FOR BAR CODE SCANNING. To control operation of generator 400, a dedicated keyboard 406 attached to housing 405 may be included. Alternatively, a port for connection with a standard PC alphanumeric keyboard and controller, such as keyboard 156 and controller 155 illustrated in FIG. 1, may be included. The design and construction of p. bar code generator apparatus and/or bar code scanning apparatus which may be suitable for use as peripheral 404 are within the scope of those reasonably skilled in the art, as are the design of housing 405, power supply 410, and keyboard 406, as well as their interconnection with generator 200. A detailed implementation of such devices will not be included herein for the sake of brevity. Generator 400 may be used with both tangible documents as well as electronic files supplied to generator 400 via connection to a computer or network, as illustrated in FIG. 4B. Specifically, any number of time stamp generators 200, as coupled to computer systems 100 or standalone generators 400 may be connected over a local area network, wide area network, or, over the Internet. As illustrated in FIG. 4B, an external receiver 402A, e.g. a GPS receiver, is coupled over a computer network to computer systems 100A–C, each of which include a time stamp generator 200A–C, respectively, in accordance with the present invention. A standalone time stamp generator 400A and 400B are further coupled to receive 402A in a similar manner. Time stamp generator 400B itself includes its own receiver 402B. Any number of time stamp generators may be intercoupled over a network, provided at least one external receiver is accessible through the network to provide the necessary information for the time and date portion of the time stamp. The limitations of actual network configurations are dictated by the bandwidth of the network, the protocol, and the number of ports available on each respective apparatus. In this matter, a single receiver may provide the necessary time and date information to multiple time stamp generators, thereby eliminating the need for each time stamp generator to be coupled directly to a single external time source.

Figure 5:
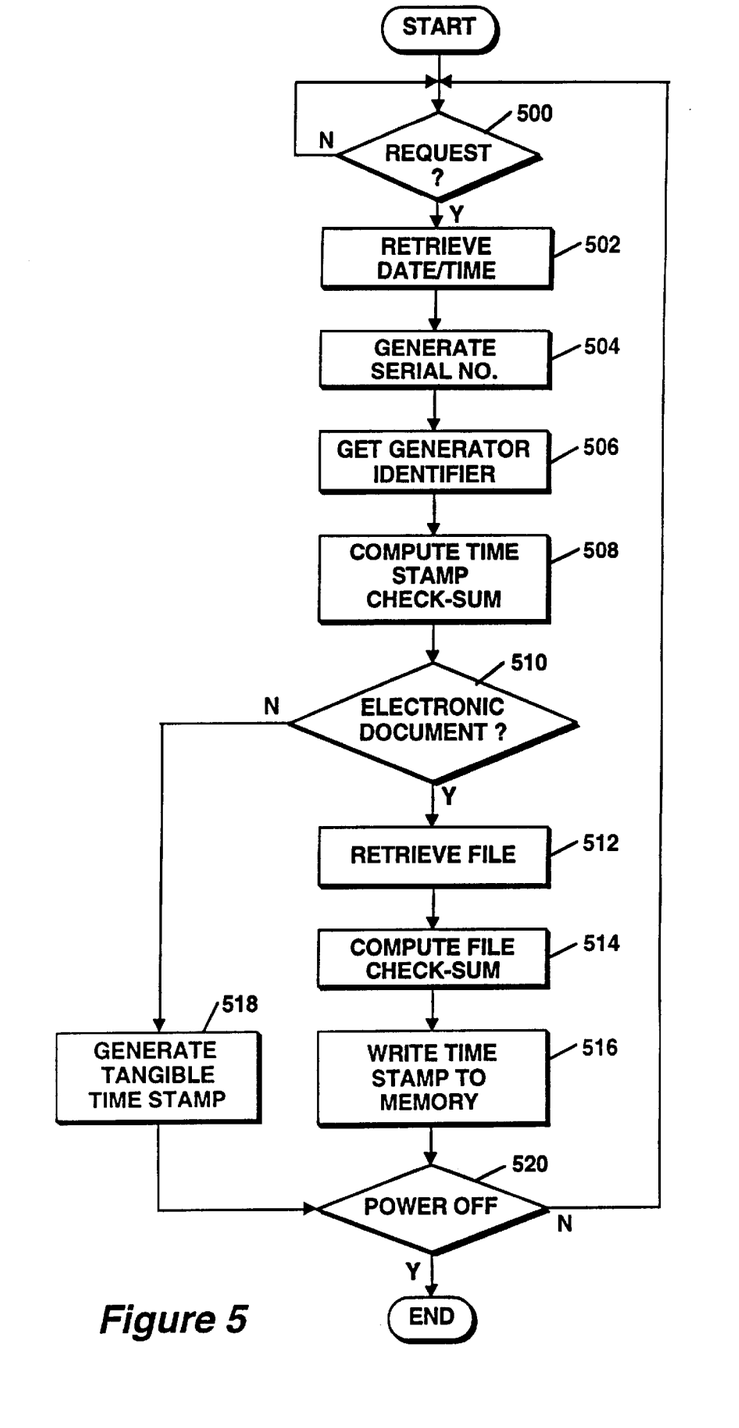
FIG. 5 is a flow-chart illustrating the inventive method for generating the notary time stamp of FIG. 3.

FIG. 5 is a flow chart illustrating the basic process steps used by processor 206 to generate a notary time stamp in accordance with the present invention. The coding of the process steps of the illustrated flow chart information instructions suitable for control of processor 206 will be understandable by one having ordinary skill in the art of programming. The process steps described within FIG. 5 applicable equally to either generator 200 or 400.

Following power-on and initialization, processor 206 remains idle until a request is received for generation of a time stamp, as illustrated by decisional block 500. Processor 206 retrieves an externally generated time signal from receiver 202, either directly through a serial or parallel port, or through a network necessary connection, as described previously. Once the time and date data is retrieved, any necessary reformatting of the data occurs and the data is stored in buffer 210 as the value of field 302 of FIG. 3. Next, processor 206 requests a write/read operation to be performed on PROM 222. The operation triggers selection of the next address from the PROM and further triggers a high energy write signal to be applied to the selected PROM address. The cell(s) addressed are then irreversibly burned and the output signature of the PROM supplied to processor 206 for appending to the contents of buffer 210 as the value of field 308. This process is illustrated by procedural block 504. Next, processor 206 retrieves the generator identifier, typically from ROM, and appends the value to buffer 210 as the value of field 306, as illustrated in FIG. 3. Next, a check-sum algorithm is applied to some or all of the contents of buffer 210 and the check-sum value written into the buffer 210 as the value of field 310, as illustrated by process 508.

If the request for a time stamp included the name of a file, processor 206, in conjunction with the operating system of computer system 100 and any applicable network's protocols causes the file contents to be retrieved and temporarily written to RAM 208, as illustrated by decisional block 510 and procedural block 512. Next, processor 206 causes a check-sum algorithm to be applied to the contents of the file in RAM 208, as illustrated by the procedural block 514. The resulting check-sum value is appended to the contents of buffer 210 either in place of the existing check-sum field 310 or in addition thereto, as illustrated by procedural block 514. Next, processor 206 causes the contents of buffer 210, representing the notary time stamp, to be written to an area of memory associated with the data file and accessible only by the time stamp generator 200. In the illustration embodiment, only field 302, 306, 308 and 304, if applicable, are viewable or added to the header information of a file. The check-sum value(s) are not visible to anyone viewing the time stamp or the file.

Alternatively, if the request for a time stamp was not accompanied with the name of a data file, the contents of buffer 210 may be written to a peripheral device, such as bar code generator 404 for application to a tangible document, as illustrated by procedural block 518. If power has not been removed from generator 200 the process remains in idle while awaiting the next request for a time stamp, as illustrated.

The process illustrated in FIG. 5 may also be utilized to generate a time stamp a 300 including optional positional information 304. Such positional information would be added to buffer 210 in procedural step 502. Where such positional information is directly available from the external receiver, the information is retrieved along with the date and time information. Use of positional information in time stamp 300, is valid only where the position of the receiver is within reasonable proximity, e.g. the error differential of the receiver, to the actual time stamp generator itself. Otherwise, particularly in the instance of network connections or retrieval of time and date information over the Internet, the location of the specific receiver may be irrelevant to the location of the time stamp generator generating the time stamp in question.

Figure 6:
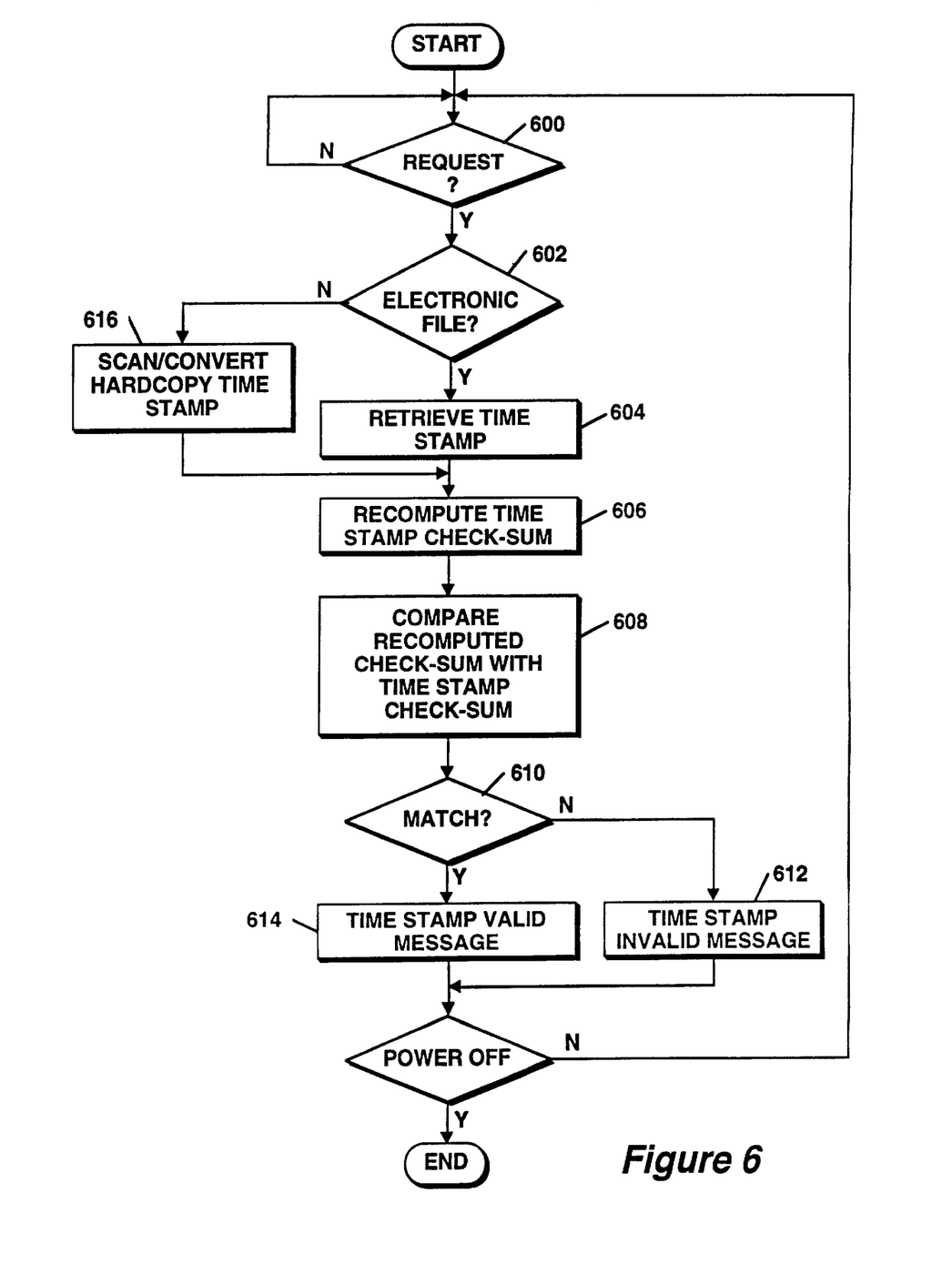
FIG. 6 is a flow-chart illustrating the inventive method for validating the notary time stamp generated by the process illustrated in FIG. 5.

FIG. 6 is a flow chart illustrating the basic process steps used by processor 206 to validate a notary time stamp in accordance with the present invention. The coding of the process steps of the flow chart into instructions suitable for control of processor 206 will be understood by one having ordinary skill in the art of programming. The process steps described in FIG. 6 are applicable equally to either a generator 200 or a generator 400.

Following power-on and initialization, processor 206 remains idle until a request for validation of a time stamp is received, as illustrated by decisional block 600. In procedural block 602, processor 206 determines whether or not the request was accompanied by an address in memory of an electronically stored time stamp, as well as possibly the address of the data file associated with the time stamp, as illustrated by decisional block 602. Next, processor 206 retrieves the time stamp value, including the check sum values, from the designated memory location, as illustrated in by processed block 604. Next, processor 206 causes the same check sum algorithm to be applied to the contents of the retrieved time stamp value, as illustrated by procedure block 606. The recomputed check sum value is then compared to the value within the retrieved time stamp, as illustrated by procedural block 608, to determine if a match occurs, as illustrated by decisional block 610. If no match occurs, indicating that the contents of the time stamp have been altered from their original value, processor 206 causes a message to be displayed and/or printed to the user indicating that the integrity of the retrieved time stamp is no longer valid, as illustrated by procedural block 612. If the recomputed and retrieved check sum values match, processor 206 will display and/or print a message indicating that the retrieved time stamp is valid, as illustrated by procedural block 614.

If a data file address was specified along with the address of the electronically stored time stamp, processor 206 will retrieve the referenced data file in block 604, as well, and also recompute the check sum value for the data file, if applicable, in block 606. Next, the contents of the recomputed data file check sum will be compared with 25 the data file check sum from the retrieved time stamp, in a manner similar to that previously described with reference to procedural blocks 606 and 608. If a match occurs, processor 206 will cause a message to be displayed and/or printed indicating that the data file associated with the time stamp is valid, similar that displayed with reference to block 614. Alternatively, if the recomputed check sum for the datafile does not match the check sum from the retrieved time stamp, processor 206 will cause a message to be displayed and/or printed, indicating that the contents of the datafile have been altered, similar to that displayed with reference to block 612.

If, in decisional block 602, no references to memory addresses were supplied along with the verification request, processor 206 will attempt to read the value of a time stamp from peripheral 404, indicating that the time stamp is affixed to a tangible document, as illustrated in procedural block 616. The procedure then proceeds to block 606, as previously described.

It will be obvious to those reasonably skilled in the art that the contents of the time stamp check sum field 310 and any accompanying datafile check sum fields may be generated using one or more different check sum algorithms. For instance, processor 206 may be able to generate check sums using any one of a plurality of available check sum generation algorithms programmed into processor 206. In such instance, the check sum fields may include not only the value of the check sum, but a code identifying which algorithm was utilized to generate the check sum and the field within the time stamp on which the check sum was derived. In this manner, different check sum algorithms may be utilized to further reinforce the security of the time stamp generation process.

In addition, the entire time stamp itself, or, selective fields of the time stamp, may be encrypted using any number of encryption technologies such as those commercially available from RSA Data Security Inc., Redwood City, Calif. Other types of encryption algorithms including secret key encryption and public/private key encryption may be utilized with the notary time stamp of the present invention. In such instances, an identifier indicating either the key or the type of encryption utilized may be appended to the time stamp to facilitate decryption and validation processes.

Although various exemplary embodiments of the invention have been disclosed, it will be apparent to those skill in the art that various changes and modifications can be made which will achieve some of the advantages of the invention without departing from the spirit and scope of the invention. These and other obvious modifications are intended to be covered by the appended claims.

What is claimed is:

1. An apparatus for generating notary time stamps comprising:

means for retrieving a time signal, the time signal generated externally to the apparatus and comprising date and time data;

program logic configured to irreversibly create a sequential time stamp identifier which is unique to each notary time stamp for association with the date and time data, said program logic comprising a memory device having a plurality of cells, each cell of which can be programmed only once and program logic that programs at least one cell each time a notary time stamp is generated; and program logic, responsive to the sequential identifier and the date and time data, and configured to generate a notary time stamp, the notary time stamp comprising a first portion which may be utilized to verify the contents of a second portion of the notary time stamp.

2. The apparatus of claim 1 wherein the means for retrieving a time signal comprises an external port and means for accessing the external port to retrieve the time signal present thereat.

3. The apparatus of claim 1 wherein the first portion comprises a check sum having a value derived from a portion of the time stamp.

4. The apparatus of claim 1 further comprising:

program logic configured to associate the notary time stamp with a document.

5. The apparatus of claim 1 wherein the document comprise a data file and the program logic configured to associate the notary time stamp with a document comprises program logic configured to write the notary time stamp to a portion of memory associated with the data file.

6. The apparatus of claim 5 wherein the first portion comprises a check sum having a value derived from one of the time stamp and the data file.

7. The apparatus of claim 1 wherein the apparatus has associated therewith an apparatus identifier and wherein the program logic configured to generate the notary time stamp further comprises program logic, responsive to the apparatus identifier, and configured to generate a notary time stamp containing said apparatus identifier.

8. The apparatus of claim 1 in combination with a receiver, operatively coupled to the time stamp apparatus, the receiver providing the time signal.

9. In a notarial time stamp generation apparatus, a method for generating time stamps, the method comprising the steps of:

(a) receiving a request for generation of a notary time stamp;

(b) retrieving a time signal, the time signal generated externally of the apparatus and comprising date and time data;

(c) each time a request for generation of a notary time stamp is received, irreversibly modifying the output signature of a write once memory device to generate a unique time stamp identifier for each notary time stamp;

(d) generating a notary time stamp from the date and time data and the time stamp identifier; and (e) generating as part of the notary time stamp a checksum having a value derived from at least a portion of the notary time stamp.

10. The method of claim 9 wherein the apparatus includes an external port for coupling the apparatus to a time signal source and wherein step (b) comprises the steps of:

b.1 accessing the external port to retrieve the time signal.

11. The method of claim 9 wherein the apparatus has associated therewith a unique identifier and wherein step (c) further comprises the step of:

c.1 generating a notarial time stamp from the date and time data, the time stamp identifier, and the apparatus identifier.

12. The method of claim 9 further comprising the step of:

(f.) associating the notary time stamp with a document.

13. The method of claim 12 wherein the document comprises a data file and step (f) further comprises the steps of:

f.1 writing the notary time stamp to a portion of memory associated with the data file.

14. The method of claim 13 wherein step (e) comprises the steps of:

e.1 generating as part of the notary time stamp, a checksum having a value derived from one of the data file and a portion of the notary time stamp.

15. An apparatus for generating notary time stamps comprising:

means for retrieving a time signal, the time signal generated externally to the apparatus and comprising date and time data;

program logic configured to irreversibly create a sequential time stamp identifier which is unique to each notary time stamp for association with the date and time data, said program logic comprising a memory device having a plurality of cells, each cell of which can be programmed only once and program logic that programs at least one cell each time a notary time stamp is generated; and program logic, responsive to the sequential identifier and the date and time data, and configured to generate a notary time stamp, the notary time stamp having a second portion comprising the sequential time stamp identifier, the date data, and the time data, and a first portion which may be utilized to verify the contents of the second portion of the notary time stamp.

16. The apparatus of claim 15 wherein means for retrieving a time signal comprises an external port and means for accessing the external port to retrieve the time signal present thereat.

17. The apparatus of claim 15 wherein the first portion comprises a check sum having a value derived from a portion of the time stamp.

18. The apparatus of claim 15 further comprising:

program logic configured to associate the notary time stamp with a document.

19. The apparatus of claim 15 wherein the document comprises a data file and the program logic configured to associate the notary time stamp with a document comprises program logic configured to write the notary time stamp to a portion of memory associated with the data file.

20. The apparatus of claim 19 wherein the first portion comprises a check sum having a value derived from one of the time stamp and the data file.

21. The apparatus of claim 15 wherein the apparatus has associated therewith an apparatus identifier and wherein the program logic configured to generate the notary time stamp further comprises program logic, responsive to the apparatus identifier, and configured to generate a notary time stamp containing said apparatus identifier.

22. The apparatus of claim 15 in combination with a receiver, operatively coupled to the time stamp apparatus, the receiver providing the time signal.

23. The apparatus of claim 15 wherein the time signal further comprises position data and wherein the program logic configured to generate the notary time stamp further comprises:

program logic, responsive to the position data, and configured to generate a notary time stamp containing a position value.

24. The apparatus of claim 1 wherein the time signal further comprises position data and wherein the program logic configured to generate the notary time stamp further comprises:

program logic, responsive to the position data, and configured to generate a notary time stamp containing a position value.

25. The method of claim 9 wherein the time signal further comprises position data and wherein step (d) further comprises:

(d.1) generating a notary time stamp from the date, time and position data and the time stamp identifier.

* * * * *